Figure 1:
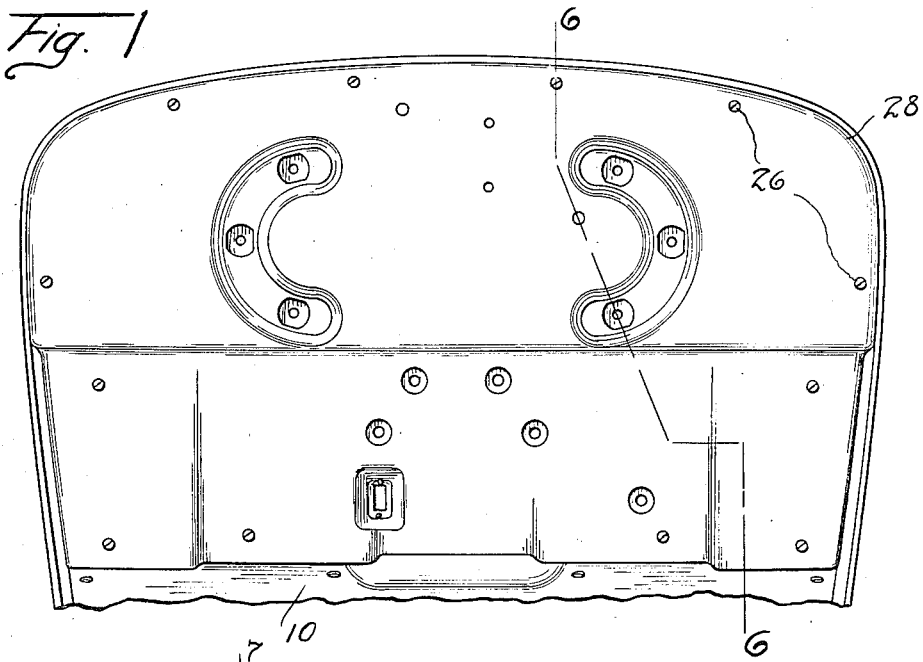

Jan. 28, 1936.  H. J. WOODALL ET AL  2,028,962
LAMINATED PANEL
Filed June 22, 1932    2 Sheets-Sheet 1

INVENTORS
Herbert J. Woodall and
Meredith S. Randall
BY Parker & Burton
ATTORNEYS

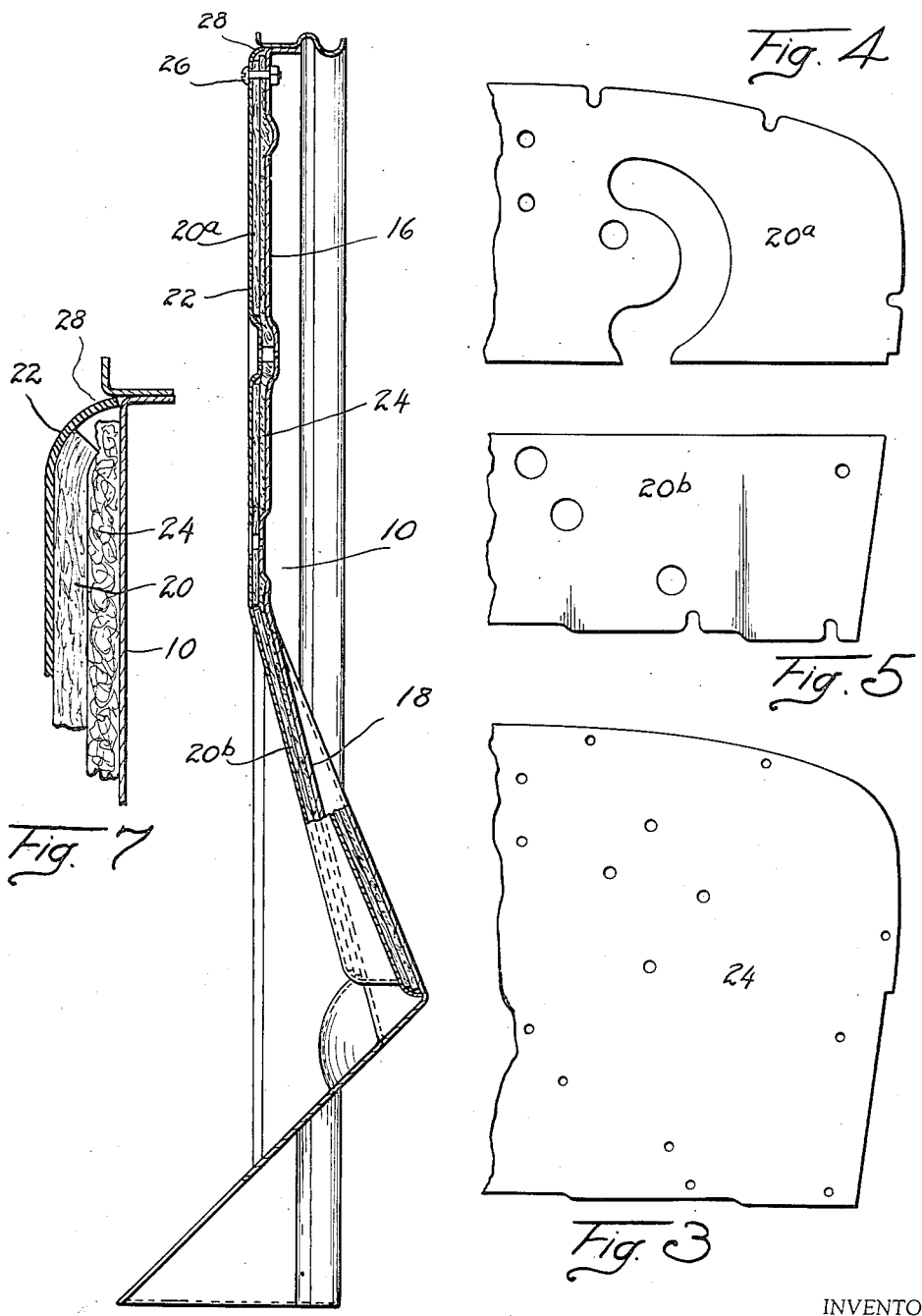

Patented Jan. 28, 1936

2,028,962

UNITED STATES PATENT OFFICE 2,028,962

LAMINATED PANEL

Herbert J. Woodall and Meredith S. Randall, Detroit, Mich., assignors to Woodall Industries Incorporated, Detroit, Mich., a corporation of Michigan Application June 22, 1932, Serial No. 618,594

4 Claims. (Cl. 154—44)

Our invention relates to improvements in laminated panels and to their method of manufacture.

An object is to provide an improved laminated panel which possesses high sound and heat insulating characteristics and which is particularly adaptable for use as a dash panel in an automobile body which will insulate the passenger carrying compartment of the body from the heat and noise produced by the engine.

A further object is the provision of such a panel structure which will effectively accomplish the desired ends and which is inexpensive to manufacture and which has an outer surface layer that may be grained or otherwise decoratively embossed to produce a suitable finish for the interior of the automobile body.

Our improved panel includes a core layer of loosely integrated fibrous material which possesses high sound and heat insulating characteristics because of the porous cellulose structure which forms a multiplicity of dead air spaces. This material is not capable of being readily deformed to accommodate itself to an irregular surface contour and in many embodiments it is wholly incapable of deformation without rupture. It is inclined to be rather inelastic and fragile. If it is deformed without rupture the structure is incapable of permanently retaining such deformed shape without breakage. Its brittle, fragile character does not lend itself to such treatment.

An object of our invention is to provide a panel which includes a core of this character as a layer or lamination of substantial thickness in combination with an adjacent layer or lamination on one side which likewise possesses insulating characteristics but which is readily deformable at all times to accommodate itself to a surface which is highly irregular in contour and which is so highly compressible that it will adapt itself to closely engage an irregularly contoured surface while at the same time it will form a cushion support throughout the entire expanse of the relatively non-deformable core layer.

Our improved panel is further characterized by being provided with an outer lamination or layer on the opposite side of the core layer which is of thermoplastic material that is readily deformable under the influence of heat and pressure to be bent to permanently assume and retain a deformed shape. This layer or lamination possesses the capacity of permanently retaining the shape to which it has been deformed and of holding the insulating core layer to such shape which such insulating core layer would not otherwise maintain.

Another important feature of our invention is that provision of a suitable process whereby a laminated panel possessing these high sound and heat insulating characteristics may be bent to permanently assume and retain a deformed shape.

Figure 2:
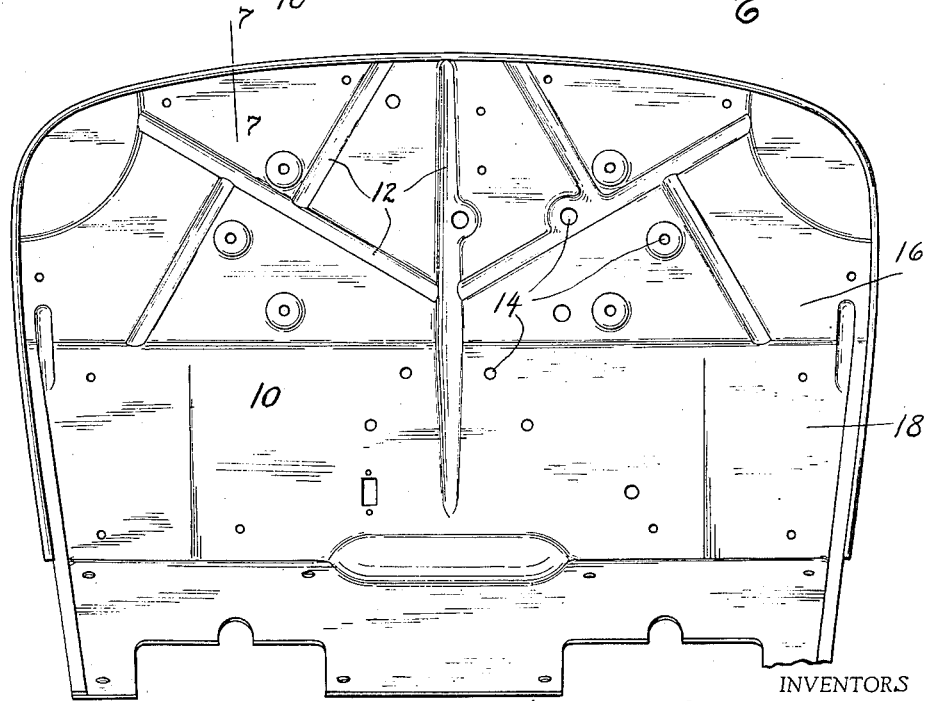

Other objects and advantages will more fully appear from the following description, appended claims, and accompanying drawings wherein:

Fig. 1 is a front elevation of our laminated panel structure,

Fig. 2 is a front elevation of the metal dash panel which forms the support for our improved laminated panel structure, Fig. 3 is a fragmentary side elevation of the cushioning layer 24, Fig. 4 is a side elevation of the fragment of the upper portion of the layer 20, Fig. 5 is a side elevation of a fragment of the lower portion of the layer 20, Fig. 6 is a cross sectional view taken on line 6—6 of Fig. 1, and Fig. 7 is an enlarged fragmentary cross sectional view taken on line 7—7 of Fig. 2.

In the manufacture of automobile bodies it is becoming increasingly important to provide heat and fuel insulation. It is necessary that this additional provision for comfort be carried out without adding appreciably to cost. It is furthermore necessary that it be accomplished in such a fashion as not to provide parts which will increase the danger of rattle.

We have provided a laminated panel structure which possesses high sound and heat insulating characteristics through the employment of a lamination particularly adapted for such purpose and, in addition, there is provided a lamination which is responsive to decorative treatment so that it forms a suitable interior trim layer for the automobile body and in addition such layer possesses characteristics which render it readily deformable and capable of retaining permanently its deformed shape. Furthermore, we provide a third lamination arranged on the opposite side of the insulating lamination which is highly deformable at all times and readily compressible so that it is adapted to be arranged adjacent the metal dash which has a highly contoured surface and which closely engages such dash and fills all the irregularities therein and affords a cushion support for the insulating layer.

In the drawings, Fig. 1 is a front elevation of the complete structure while Fig. 2 shows a metal dash indicated as 10. This dash member is reinforced with corrugations such as 12 which stiffen and strengthen the same and is provided with a plurality of apertures 14 which serve for the passage of conduits or other operating parts of the car therethrough and which serve as apertures for attachment of the panel in place. The panel shown is a conventional one used on a well known make of car. It has an upper portion 16 disposed in one plane (see Fig. 6) and a lower portion 18 in an angularly disposed plane. The requirements of car structure insure that such panels will have a highly irregular contoured surface and this varies widely in different types of vehicles.

Our improved panel construction is adapted to be so shaped and formed that it may be used with practically any type of metal dash panel structure. It comprises an inner core layer 20. This core layer is shown, as in Fig. 6, and is formed of two sections being an upper section 20a and a lower section 20b. This lamination or layer consists of loosely integrated fibers and possesses high sound and heat insulating properties. The construction is such that an infinite multiplicity of dead air cells is provided. The layer is, however, relatively inflexible and fragile and does not lend itself to deformation without rupture. While we do not wish to limit ourselves to any specific product, a suitable type of commercial material is that known as "Masonite". If the material is deformed it will not retain such deformed shape without breakage.

Associated with this layer of high insulating characteristics we provide a tough elastic outer layer 22 which comprises closely compacted fibers held together by a suitable thermoplastic binder such as a combination asphalt binder. Without limiting ourselves specifically, we have found that a suitable commercial product is that known as "K B" board. This outer layer is readily deformable under the influence of heat and pressure to assume and permanently retain a deformed shape. We adhesively secure this outer layer to the several sections of the core layer so that when the panel structure is shaped the core layer is held to its deformed shape by the outer layer 22.

This outer layer is adapted to be treated to give it a decorative or embossed surface which is suitable for the interior trim of an automobile body.

To the opposite side of the core layer we secure a very loosely integrated fibrous layer 24. This layer possesses heat and sound insulating characteristics but to a far less degree than does the inner core layer. It possesses the characteristics, however, of being very readily deformable at all times and of being highly flexible and compressible so that it easily accommodates itself to the irregular surface contour of the metal dash panel 16. This third layer is adhesively secured to the inner core layer and forms a resilient compressible cushion which engages the metal dash panel. When the bolts 26 are secured in place and drawn tight this layer 24 is compressed to substantially fill all the depressions and irregularities present in the metal dash and to afford a continuous cushion support for the core layer 20.

The outer decorative layer 22 is turned over at the edges as at 28 to cover the exposed edges of the two insulating layers.

By employing a construction of this type it is readily possible to deform the inner core layer to suit the necessary contour of the panel. Such inner core layer is held to its deformed shape by the outer decorative layer to which it is secured. It is also held between such outer layer and the opposite outer cushioning layer so that any tendency toward breakage or rupture would be held against injuriously affecting the panel as a whole. The cushioning layer itself, while generally retaining such deformed shape is sufficiently further deformable and compressible at all times to accommodate itself to any irregularities present in the surface against which it is laid. It is furthermore resilient and yielding in use so that any distortion or swaying or bending of the metal dash is taken up therein without being imparted to the relatively rigid inner core layer.

What we claim:

1. An automobile dash panel comprising a plurality of laminations of material secured together to form an integral structure and comprising a core layer of loosely integrated fibrous material possessing high insulating characteristics but substantially incapable of being bent to assume and permanently retain a deformed shape without rupture, an outer tough elastic layer of loosely compacted fibrous material held together by a thermoplastic binder and being readily deformable under heat and pressure to assume and permanently retain a deformed shape secured to one side of the core layer to hold the core layer to such deformed shape, and a highly compressible readily deformable layer of fibrous cushioning material secured to the opposite side of the core layer and being easily yieldable to assume at all times a deformed shape and compressible to a high degree to follow closely an irregular contoured surface against which it may be laid.

2. A laminated panel structure comprising, in combination, a core layer of loosely integrated fibrous material possessing high sound and insulating properties but not readily deformable and being relatively inflexible and fragile, an outer lamination of tough fibrous material secured to one side of said core layer and being of a closely compacted fibrous character wherein the fibers are held together by a thermoplastic binder which renders the lamination readily deformable under the effect of heat and pressure to assume and permanently retain a deformed shape, an inner lamination of highly compressible readily deformable loosely integrated fibrous cushioning material secured to the opposite side of said core layer, means securing said several laminations together, said outer layer of closely compacted tough elastic material being turned over at the margin to cover the edges of the two adjacent layers.

3. An automobile dash panel comprising a plurality of laminations of materials secured together to form an integral structure and consisting of an outer lamination of tough elastic closely compacted, fibrous material held together by a thermoplastic binder, said lamination being readily capable of assuming and permanently retaining a deformed shape under the effect of heat and pressure, said layer being deformed to lie in two relatively angularly disposed planar portions, a core layer of loosely integrated fibrous material possessing high sound and heat insulating characteristics but relatively inflexible and non-deformable comprising two sections, one section lying adjacent and secured to one angularly disposed planar portion of the first layer and the other section lying adjacent and secured to the other angularly disposed planar portion of the first layer, and a third layer of loosely compacted fibrous material readily deformable and highly compressible secured to the opposite side of the core layer sections.

4. A laminated panel structure comprising, in combination, a layer of loosely integrated fibrous material possessing high sound insulating properties, an outer layer of thermoplastic asphalt impregnated fibrous self supporting material responsive to heat and pressure to assume and permanently retain a deformed shape permanently secured to one side of the first layer, and an outer layer of flexible deformable cushioning material secured to the opposite side of said first layer.

HERBERT J. WOODALL.
MEREDITH S. RANDALL.